United States Patent [19]
Dubach
[11] 4,285,111
[45] Aug. 25, 1981

[54] BEARING PULLER ALIGNMENT TOOL

[76] Inventor: Harry Dubach, 314 N. 700 E., Kaysville, Utah 84037

[21] Appl. No.: 163,136

[22] Filed: Jun. 26, 1980

[51] Int. Cl.[3] .............................................. B23P 19/04
[52] U.S. Cl. ...................................................... 29/263
[58] Field of Search ................. 29/256, 258, 263, 264, 29/265, 266, 280

[56] References Cited

U.S. PATENT DOCUMENTS

| | | | |
|---|---|---|---|
| 1,438,039 | 12/1922 | Hurlbut | 29/263 |
| 1,935,218 | 11/1933 | Umbach | 29/256 X |
| 3,058,207 | 10/1962 | Wilson | 29/264 X |
| 4,065,844 | 1/1978 | Lieser et al. | 29/258 |

*Primary Examiner*—Robert C. Watson
*Attorney, Agent, or Firm*—Donald J. Singer; Arsen Tashjian

[57] ABSTRACT

The tool is useful for the replacement of the lateral control torque tube bearings on high performance aircraft. The bearings are pulled into position into the bulkhead in a straight line thereby preventing them from becoming jammed because of the angle of the bulkhead surface into which the bearings are to be installed. The tool self-aligns the bearings without putting pressure on the bearing race thereby preventing the possibility of damage to the bearing and since the use of a shoulder driver and hammer are no longer required, damage to the bearing and/or aircraft is virtually eliminated.

1 Claim, 4 Drawing Figures

FIG. 1
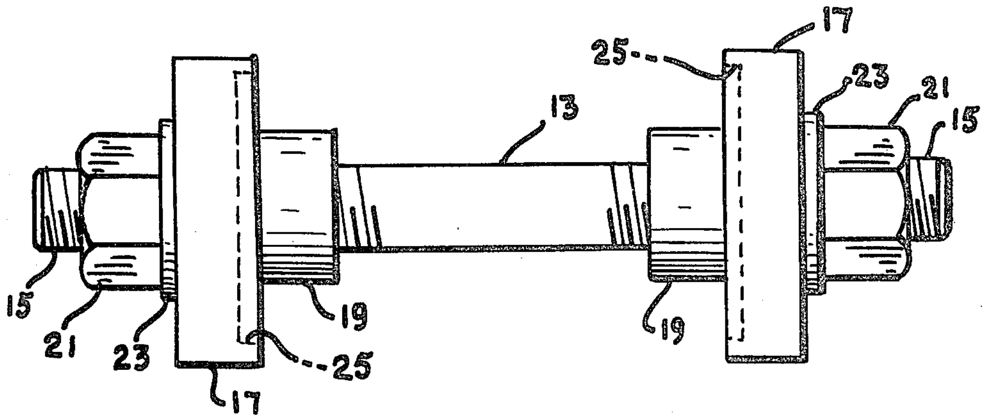
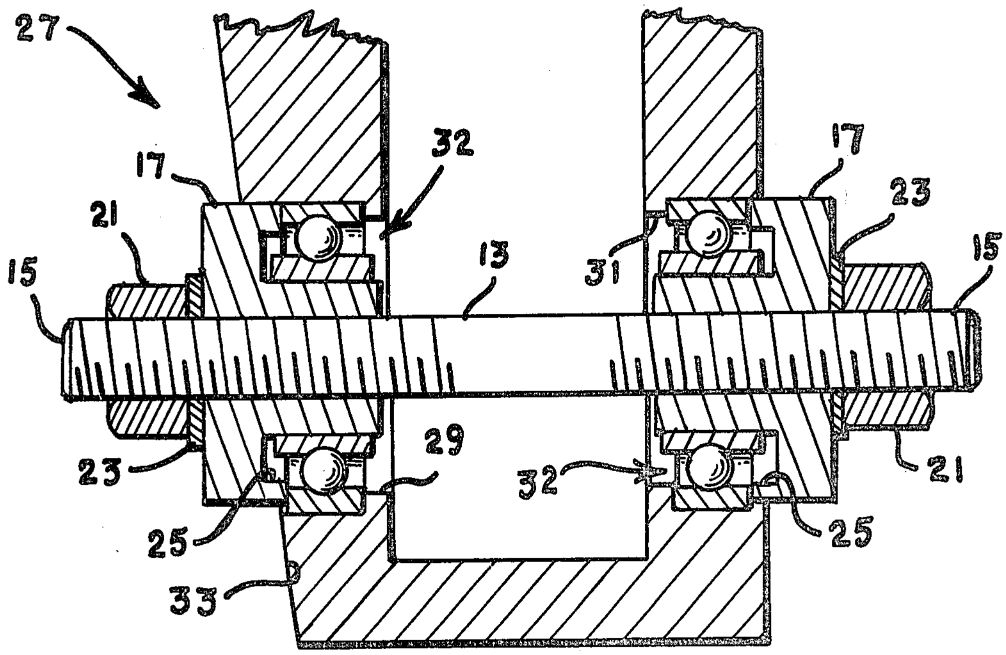
FIG. 3

BEARING PULLER ALIGNMENT TOOL

STATEMENT OF GOVERNMENT INTEREST

The invention described herein may be manufactured and used by or for the Government for governmental purposes without the payment of any royalty thereon.

BACKGROUND OF THE INVENTION

The present invention relates to a bearing puller alignment tool and, more particularly, the invention is concerned with providing a tool that enables a mechanic to position and align the bearings on the bell crank torque tubes on an F-4 aircraft in less time without damage to the bearings.

One of the problems which arises when it is necessary to replace the bearings on an F-4 aircraft lateral control torque tube is the proper installation of the new bearings without damage to the aircraft or the bearings. The surface which contains one of the openings into which the bearings are to be installed is slanted making it very difficult to start the bearing in straight.

Previously a shoulder driver and a hammer were used to install these bearings in the bulkhead. However, this usually caused damage to the aircraft or the bearing or both because the bearing would easily jam in an angled position and had to be straightened and/or removed. Thus, it can be seen that much time and effort can be saved if the bearings could be pulled into place in a straight line even when the surface of the opening is at an angle. Also, it would be most desirable to accomplish this without putting pressure on the bearing race so that the bearing will not be damaged in any way and no hidden defect could cause a dangerous condition to arise.

SUMMARY OF THE INVENTION

The invention is concerned with providing a bearing puller alignment tool suitable for installing the bearings on a lateral control torque tube on the F-4 aircraft. The bearings are installed in openings one of which is located in the slanted surface wall of the bell crank and fit around the torque tube. The bearing puller tool self aligns the bearings during the installation operation and does not put pressure on the bearing race.

Accordingly, it is an object of the invention to provide a bearing puller alighment tool for replacing the lateral control torque tube bearings on the F-4 aircraft.

Another object of the invention is to provide a bearing puller alignment tool wherein the bearings are pulled into the slanted bulkhead of the bell crank in a straight line thereby preventing them from becoming jammed in an angled position.

Still another object of the invention is to provide a self aligning bearing puller wherein the bearing is installed in the bell crank without putting pressure on the bearing race and causing possible damage to the bearing.

A further object of the invention is to provide a tool for installing the bearings on the bell crank of the lateral control torque tubes wherein the bearings are pulled into the bulkhead in a straight line in less time without damage to the bearing and/or the aircraft.

These and other objects, features and advantages will become more apparent after considering the following detailed description taken in conjunction with the annexed drawings and appended claims.

BRIEF DESCRIPTION OF THE DRAWINGS

FIG. 1 is a side view of a bearing puller alignment tool according to the invention showing the main shaft, flanges with collars, thrust washers and threaded nuts;

FIG. 3 is a view in cross section of the bearing puller of FIG. 1 showing the bearings installed in the aircraft part of FIG. 2 after being pulled into position by the bearing puller.

DESCRIPTION OF A PREFERRED EMBODIMENT

Figure 2:
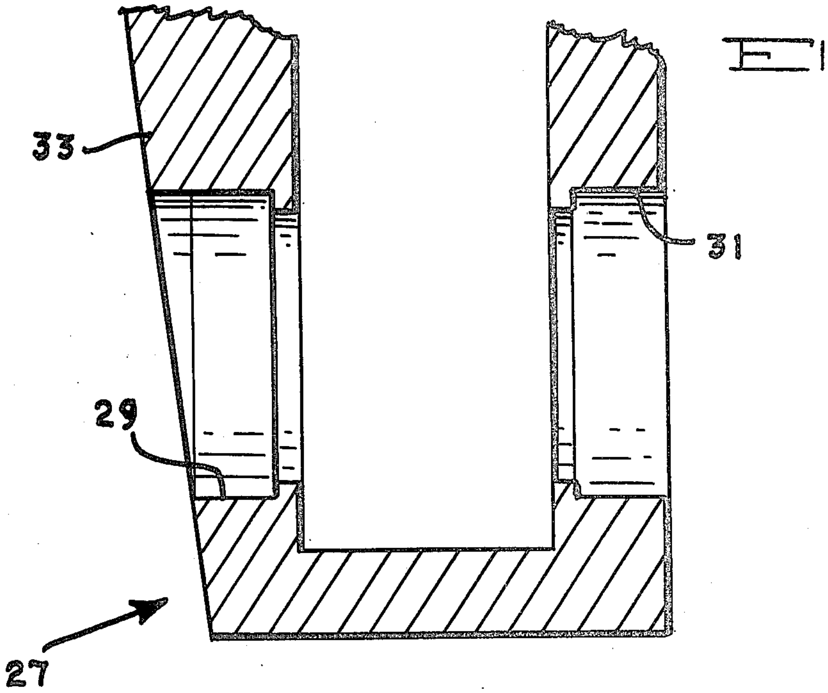
FIG. 2 is a side view in partial section of the aircraft part on the F-4 in which the lateral control torque tube is positioned.
Figure 4:
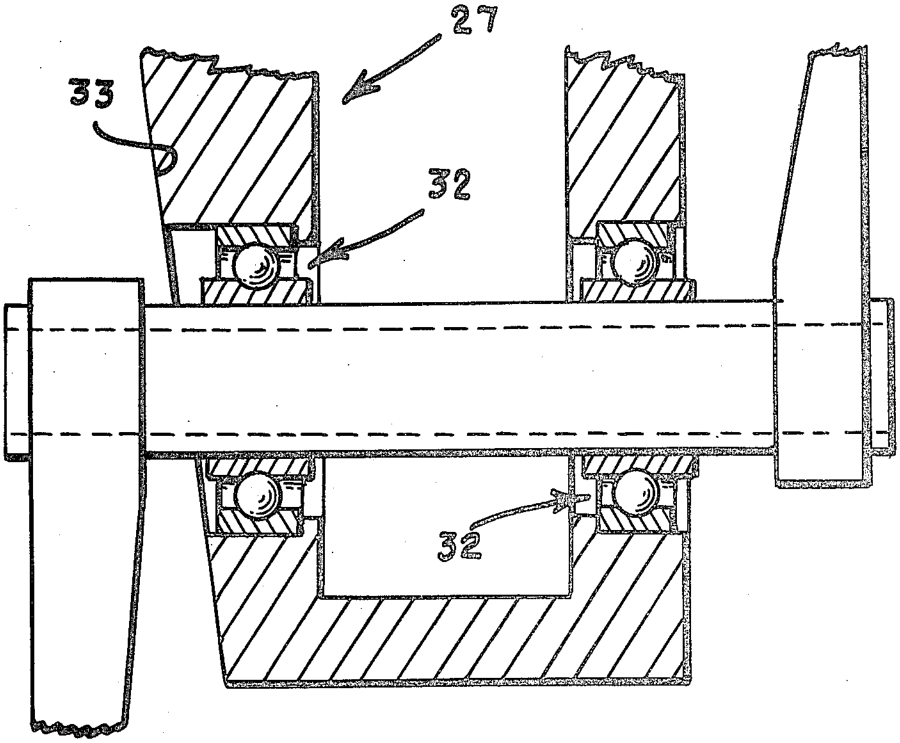
FIG. 4 is a view in partial section of a lateral control torque tube assembly with the bearings and bell crank in position and the bearing puller alignment tool removed.

Referring now to the Figures, in FIG. 1 there is shown a side view of the self-aligning bearing puller according to the invention. The bearing puller includes a main shaft 13 with the threads 15 machined on both ends. A pair of flanges 17 having collars 19 on the inner side thereof include a center opening dimensioned to slide over the main shaft 13 for lateral movement therealong. Each end of the shaft 13 is provided with a nut 21 for engaging the threads 15 and a thrust washer 23 is positioned between the nut 21 and the outer surface of the flange 17 to minimize the effect of friction between the parts. The inner surface of the flange 17 is undercut to leave a small lip 25 on its outer circumference.

In FIGS. 2 and 3 there is shown in cross section the aircraft part 27 with the openings 29 and 31 into which the bearings 32 are to be installed. It should be noted that the bulkhead surface 33 is slanted with respect to the opening 29. This creates a very difficult problem in aligning the bearing in the opening 29 so that it will go in straight and not become jammed in an angled position. In FIG. 3, the bearing puller and bearings 32 are shown within the aircraft part 27 after the bearings 32 have been pulled into position. It should be noted that the inner contact surface of the flange 17 is undercut to form the lip 25 so that lateral pressure is applied to the outer ring only of the bearing 27 and not to the inner race thereby preventing possible damage to the bearing 27.

In operation, the bearings 32 are slipped over the collars 19 against the inner surface of the flanges 17 so that only the outer ring of the bearings 32 contacts the lips 25 on the outer edge of the flanges 17. The flanges 17 with the bearings 32 in position are then slipped over the shaft 13 which is in place in the aircraft part 27 such that the threaded ends 15 of the shaft 13 protrude from each side of the part 27. The thrust washers 23 are then slipped over each of the threaded ends 15 of the shaft 13 against the outer surface of each of the flanges 17. The nuts 21 are threadably engaged with the threads 15 on each end of the shaft 13 and turned causing the bearings 32 to be pulled into position in the openings 29 and 31 in the aircraft part 27. Since the pressure produced when the nuts 21 are tightened is along the line of the shaft 13, the bearing 32 is caused to move in a straight line along the shaft 13 even though the wall of the aircraft part 27 is slanted in the vicinity of the opening 29. This arrangement prevents the bearing 22 from starting crooked in the opening 29 and causing damage to either the bearing 32 or the aircraft part 27 or both.

Although the invention has been illustrated in the accompanying drawings and described in the foregoing specification in terms of a preferred embodiment thereof, the invention is not limited to this embodiment or to the preferred configuration shown. It will be apparent to those skilled in the art that with slight modification my invention could have extensive use in the installation of similar type bearings that are hard to get at on the F-4 aircraft. Also, the tool can be used to pull in one bearing during an operation as well as two at the same time. Since there are six sets of lateral control torque tube bearings on the F-4 aircraft, it can be seen that the hereinbefore described tool will save a great deal of time and prevent possible damage to the bearings as well.

Having thus set forth the nature of my invention, what I claim as new and desire to secure by Letters Patent of the United States is:

1. A bearing puller alignment tool for installing ball bearings in an aircraft part having one opening in an angularly oriented wall surface, said tool comprising a shaft with threads on each end thereof, a pair of flanges slidable along said shaft, a lip disposed on the inner face of each of said flanges at its outer circumference to cause pressure to be applied only to the outer ring of the ball bearings when the bearings are pulled into position, a thrust washer positioned on each end of said shaft adjacent the outer faces of said flanges to minimize the effect of friction when the bearings are pulled into position, a collar on the inner face of each of said flanges for holding said bearing, the inside diameter of said bearings fitting over the outside diameter of said collars, and a nut on each end of said shaft in engagement with the threads thereon whereby the tightening of said nuts produces a corresponding inward movement of said flanges and bearings causing said bearings to be pulled into position in the aircraft part along a straight line regardless of the angularly oriented wall in the aircraft part.

* * * * *